(12) United States Patent
Masterson et al.

(10) Patent No.: US 8,588,300 B1
(45) Date of Patent: *Nov. 19, 2013

(54) EFFICIENT TRANSCODING BETWEEN FORMATS USING MACROBLOCK BUFFER

(75) Inventors: Anthony D. Masterson, Saratoga, CA (US); William Ka-ming Chan, Cupertino, CA (US)

(73) Assignee: Zenverge, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/450,307

(22) Filed: Apr. 18, 2012

Related U.S. Application Data

(63) Continuation of application No. 11/851,879, filed on Sep. 7, 2007, now Pat. No. 8,179,964.

(51) Int. Cl.
*H04N 7/12* (2006.01)

(52) U.S. Cl.
USPC ............ 375/240.12; 375/240.02; 375/240.16; 375/240.23; 375/240.24; 375/240.25

(58) Field of Classification Search
None
See application file for complete search history.

(56) References Cited

PUBLICATIONS

H.264/MPEG-4 AVC products and implementations—Wikipedia, printed out year 2012.*
Deblocking filter—Wikipedia, printed out year 2012.*
Macroblock—Wikipedia, printed out year 2012.*
Transcoding—Wikipedia, printed out year 2012.*
"MPEG Encoding Basics," Snell & Wilcox, published as early as May 2002, 7 pages.
Wiegand, T. et al., "Overview of the H.264/AVC Video Coding Standard," IEEE Transactions on Circuits and Systems for Video Technology, Jul. 2003, pp. 560-576, vol. 13, No. 7.

* cited by examiner

*Primary Examiner* — Linglan Edwards
(74) *Attorney, Agent, or Firm* — Fenwick & West LLP (57) ABSTRACT

Transcoder chip having a buffer for temporarily storing decoded macroblocks and compressed domain parameters. A video decoding module of the transcoding chip decodes and stores the decoded macroblocks in the buffer in a first sequence. The video encoding module then reads the data from the buffer in a second sequence different from the first sequence to encode the macroblocks in a different format. The buffer can also be used for deblocking the macroblocks and for filtering motion vectors. By using the buffer, data traffic between the transcoding chip and external memory is reduced, increasing the speed for transcoding a video sequence from one format to another.

20 Claims, 7 Drawing Sheets

EFFICIENT TRANSCODING BETWEEN FORMATS USING MACROBLOCK BUFFER

CROSS-REFERENCE TO RELATED APPLICATIONS

This application is a continuation of U.S. patent application Ser. No. 11/851,879 entitled "Efficient Transcoding Between Formats Using Macroblock Buffer," filed on Sep. 7, 2007, which is incorporated by reference herein in its entirety.

BACKGROUND

1. Field of Art

The disclosure relates generally to transcoding a video sequence from one format to another, and more specifically to transcoding a video sequence in a H.264 format to a MPEG-2 format or transcoding a video sequence in the MPEG-2 format to the H.264 format.

2. Description of Related Art

The H.264 standard allows two fields of an interlaced frame to be coded separately (i.e., field-based coding). Specifically, in the H.264 standard, the frame/field coding of a frame may be adaptively varied using a scheme called Macroblock-Adaptive Frame/Field (MBAFF) coding. If a frame consists of mixed regions where some regions are moving and others are not, it is generally more efficient to code the non-moving regions in the frame-based coding, and the moving regions in the field-based coding.

Figure 1:
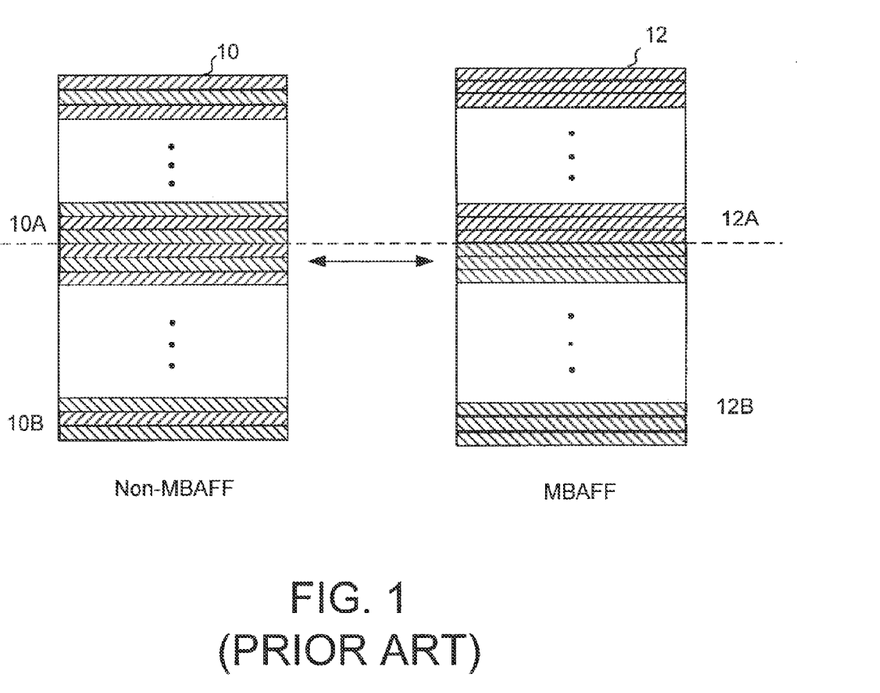
FIG. 1 is a diagram illustrating a pair of field macroblocks that are coded in an MBAFF coding sequence and a pair of field macroblocks that are coded in a non-MBAFF coding sequence.

FIG. 1 is a diagram illustrating a pair of field macroblocks 10 coded in a non-MBAFF coding sequence and a pair of field macroblocks 12 coded in an MBAFF coding sequence. In a pair of macroblocks 10 that are coded in the non-MBAFF coding sequence, both of the top macroblock 10A and the corresponding bottom macroblock 10B include odd and even lines of the interlaced frame (i.e., lines from both interlaced fields). In contrast, in a pair of field macroblocks 12 that are coded in the MBAFF coding sequence, the top macroblock 12A includes only odd lines of the frame (lines from one interlaced field) and the bottom macroblock 12B includes only even lines of the frame (lines from the other interlaced field). MBAFF frame macroblock pairs have the same line order as non-MBAFF macroblocks.

Figure 2A:
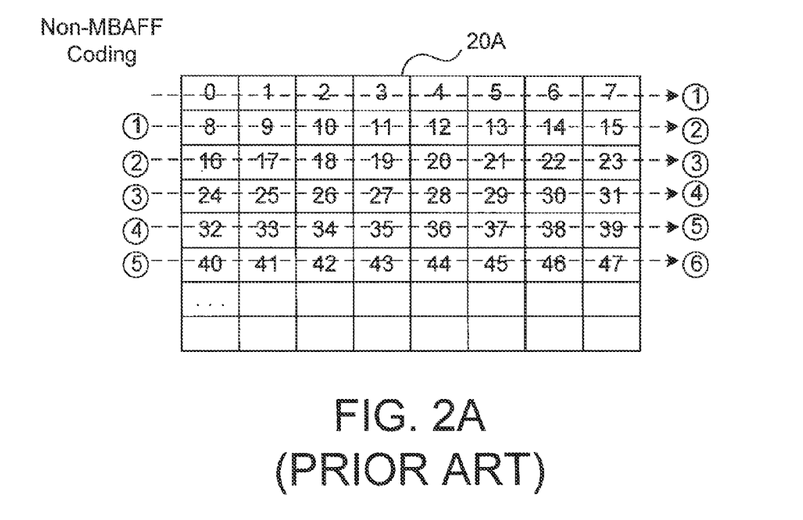
FIG. 2A is a diagram illustrating a sequence of processing macroblocks in a non-MBAFF coding sequence.
Figure 2B:
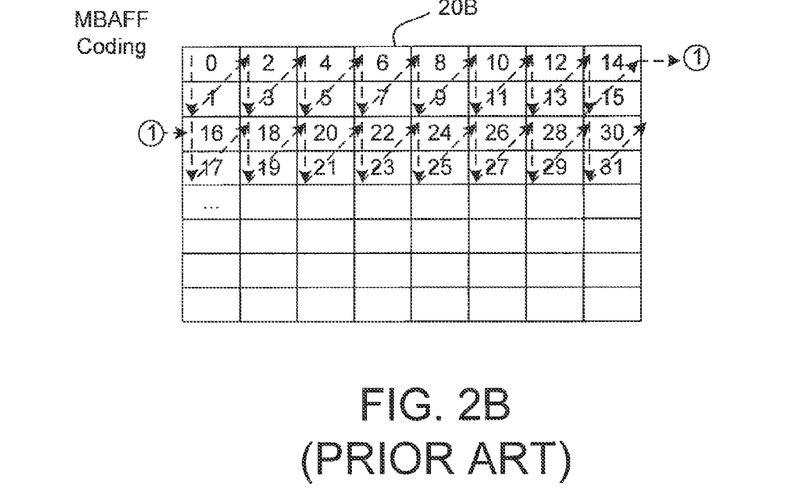
FIG. 2B is a diagram illustrating a sequence of processing macroblocks in an MBAFF coding sequence.

Some video encoding formats such as the MPEG-2 do not use the MBAFF coding sequence whereas the H.264 format can use the MBAFF coding sequence. Therefore, in order to efficiently transcode a frame picture video sequence in the H.264 MBAFF format to the MPEG-2 format or vice versa, the macroblocks must be reformatted and reorganized. Referring to FIGS. 2A and 2B, the sequences of encoding or decoding the macroblocks in the MBAFF coding sequence and the non-MBAFF coding sequence are illustrated.

In FIG. 2A, a frame 20A processed in the non-MBAFF coding sequence is illustrated. The frame 20A in the non-MBAFF case is generally processed on a per macroblock basis. In the frame 20A, the macroblocks are processed row by row. That is, one row of macroblocks is processed and then the next row of macroblocks is processed. The processing of the frame 20A is very resource intensive, requiring extensive amount of time and computations.

In FIG. 2B, a frame 20B processed in the MBAFF coding sequence is illustrated. In the MBAFF coding sequence, the macroblocks are processed in a zigzagged manner. For example, a top macroblock (for example, macroblock 0) is processed, followed by a bottom macroblock (for example, macroblock 1), and then another top macroblock (for example, macroblock 2), then a corresponding bottom macroblock (for example, macroblock 3), and so forth. Once all macroblocks in the two rows are processed, the next two rows of macroblocks are processed in the same manner.

Figure 3:
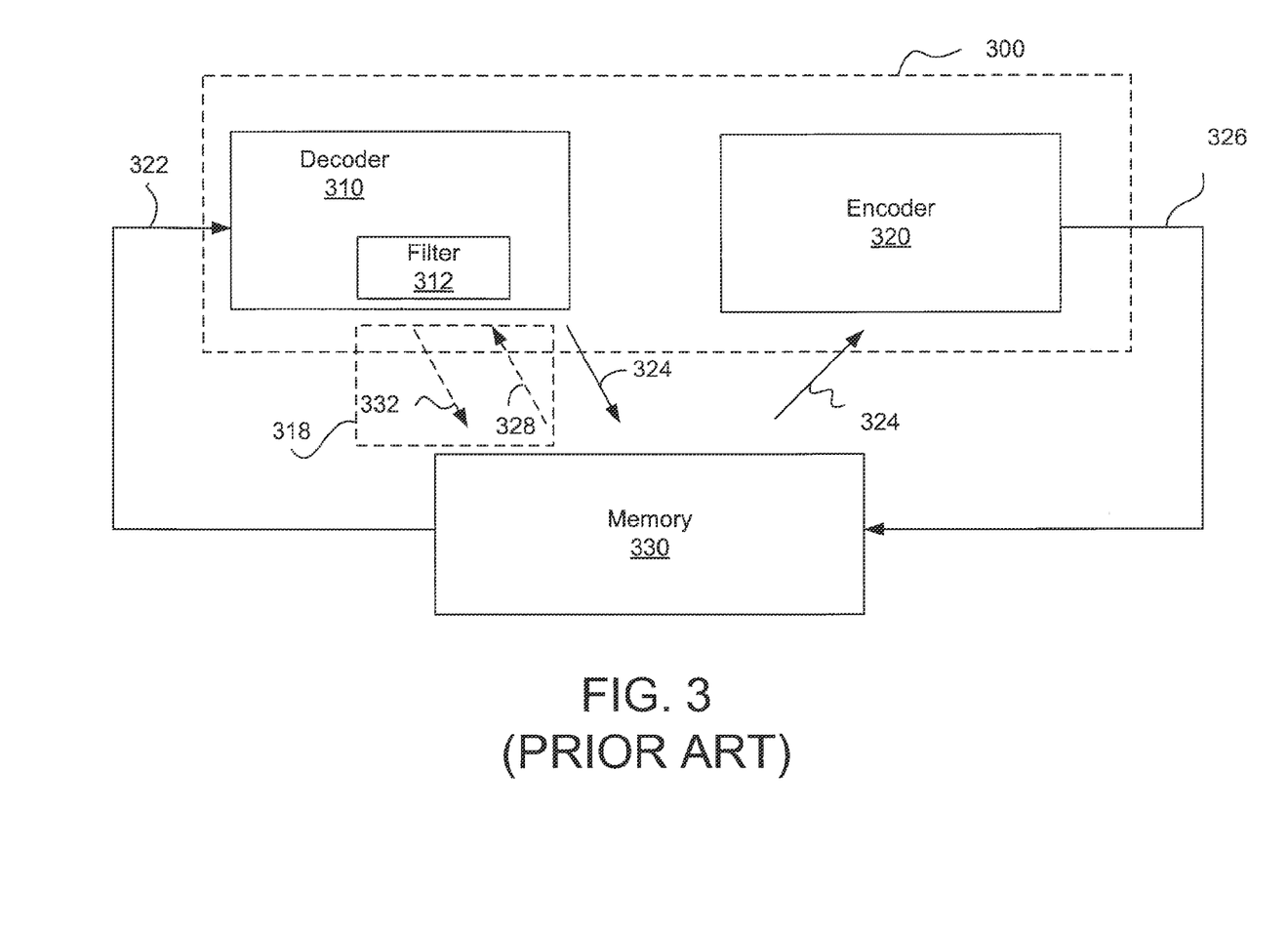
FIG. 3 is a block diagram illustrating a conventional transcoding system without a buffer.

FIG. 3 illustrates a conventional transcoding system for transcoding a frame encoded in the MBAFF coding sequence (for example, H.264 format) to a frame that is encoded in the non-MBAFF coding sequence (for example, MPEG-2 format) or vice versa. The transcoding system includes a transcoder chip 300 and external memory 330 coupled to the transcoder chip 300. The transcoder chip 300 includes a video decoding module 310 and a video encoding module 320. The video decoding module 310 reads a frame 322 of the video sequence from the external memory 330, decodes macroblocks of the frame, and then stores the decoded frame 324 in the external memory 330. Then the video encoding module 320 reads the decoded frame 324 from the memory 330, encodes the frame 324 into a transcoded frame 326, and stores the transcoded frame 326 in the external memory 330.

Note that the macroblocks decoded from the video decoding module 310 cannot be directly fed to the video encoding module 320 because the sequence for encoding the macroblocks in the video encoding module 320 is different from the sequence in which the macroblocks are decoded by the video decoding module 310. Accordingly, the video decoding module 310 and the video encoding module 320 must store and retrieve decoded macroblocks 324 via the external memory 330 to encode the decoded macroblocks 324 in a proper sequence. This results in increased amount of data exchange between the transcoding system 300 and the external memory 330 as well as increased time for transcoding the frame due to heavy data traffic between the external memory 330 and the transcoder chip 300.

The deblocking process also adds the data transfer 318 between the transcoder chip 300 and the external memory 330. In order to completely deblock a target macroblock (encoded either in the MBAFF coding sequence or in the non-MBAFF coding sequence), a deblocking filter 312 needs the macroblocks (up, down, left and right macroblocks) surrounding the target macroblock and in some cases, including macroblocks that are two macroblocks above and below. Storing 332 decoded macroblocks in the external memory 330 and then retrieving 328 the decoded macroblocks by the deblocking filter 312 for deblocking add additional data traffic between the transcoding system 300 and the memory 330, further slowing down the overall transcoding process. Moreover, there are increased costs associated with providing additional memory space in the external memory 330 for storing the decoded macroblocks even if on a temporary basis.

Therefore, the present art lacks a transcoder system that reduces data traffic between a transcoder chip and external memory when transcoding a video sequence between formats that use the MBAFF coding sequence and formats that does not use the MBAFF coding sequence. The present art also lacks a transcoder system that does not require the data transfer between the transcoder chip and external memory during deblocking process.

SUMMARY

In one example embodiment, the transcoder system or method uses a buffer to store decoded macroblocks. The buffer is provided on the same chip (transcoder chip) as the video decoding module and/or the video encoding module to reduce data traffic between the transcoder chip and memory external to the transcoder chip. As a result, the speed of transcoding a video sequence from one format to another format is increased.

In one example embodiment, the transcoder system transcodes a video sequence encoded in a format (e.g., H.264) that uses a MBAFF coding sequence into another format (e.g., MPEG-2) that does not use the MBAFF coding sequence. Alternatively, the transcoder system transcodes a format (e.g., MPEG-2) that does not use the MBAFF coding sequence into another format (e.g., H.264) that uses the MBAFF coding sequence. The video decoding module of the transcoder system decodes up to four rows of macroblocks in an interlaced frame, and stores the decoded macroblocks in the buffer. While the video decoding module is storing macroblocks into the buffer, the video encoding module of the transcoder system reads from the buffer in a sequence different from the sequence in which the macroblocks were written to the buffer.

In another example embodiment, the buffer is used for deblocking the decoded macroblocks. The video decoding module of the transcoder chip decodes the macroblocks and stores them in the buffer. The video decoding module then reads the decoded macroblocks to deblock the macroblocks. The transcoder chip need not transfer data from the video decoding module to the external memory to deblock the macroblocks; and therefore, the data traffic between the transcoder chip and the external memory is reduced. The decreased data traffic between the transcoder chip and the external memory increases the speed of overall transcoding process.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the detailed description, appended claims, and accompanying drawings. The drawings or figures (FIGS.) include:

DETAILED DESCRIPTION

The embodiments described herein will be with reference to the accompanying drawings. Like reference numerals are used for like elements in the accompanying drawings.

In embodiments described herein, transcoding of video sequences between formats using different sequences for arranging macroblocks is facilitated by storing decoded macroblocks on a buffer provided on a transcoder chip. By storing decoded macroblocks in the buffer, the data transfer between a transcoder chip and memory external to the transcoder chip is reduced. Further, the buffer has only a minimal amount of memory in order to save costs associated with manufacturing the buffer.

Macroblock-Adaptive Frame/Field (MBAFF) refers to a coding scheme in which a pair of macroblocks in an interlaced video sequence is adaptively coded. With MBAFF coding, macroblocks are coded in pairs. Specifically, for a field-coded MBAFF pair, a top macroblock includes odd lines (or even lines) of the interlaced video sequence and a bottom macroblock including even lines (or odd lines) of the interlaced video sequence. For a frame-coded MBAFF pair, the top and bottom macroblocks contain the interleaved even and odd lines.

A buffer is a temporary storage area that may be accessed faster than an external memory module. The buffer may be integrated on the transcoder chip or it may be provided as a module separate from the transcoder chip. In either case, the data bus to and from the buffer operates at a speed higher than external memory. The size of the buffer may be minimized to reduce the cost of manufacturing the transcoding system.

Overview of the Architecture

Figure 4:
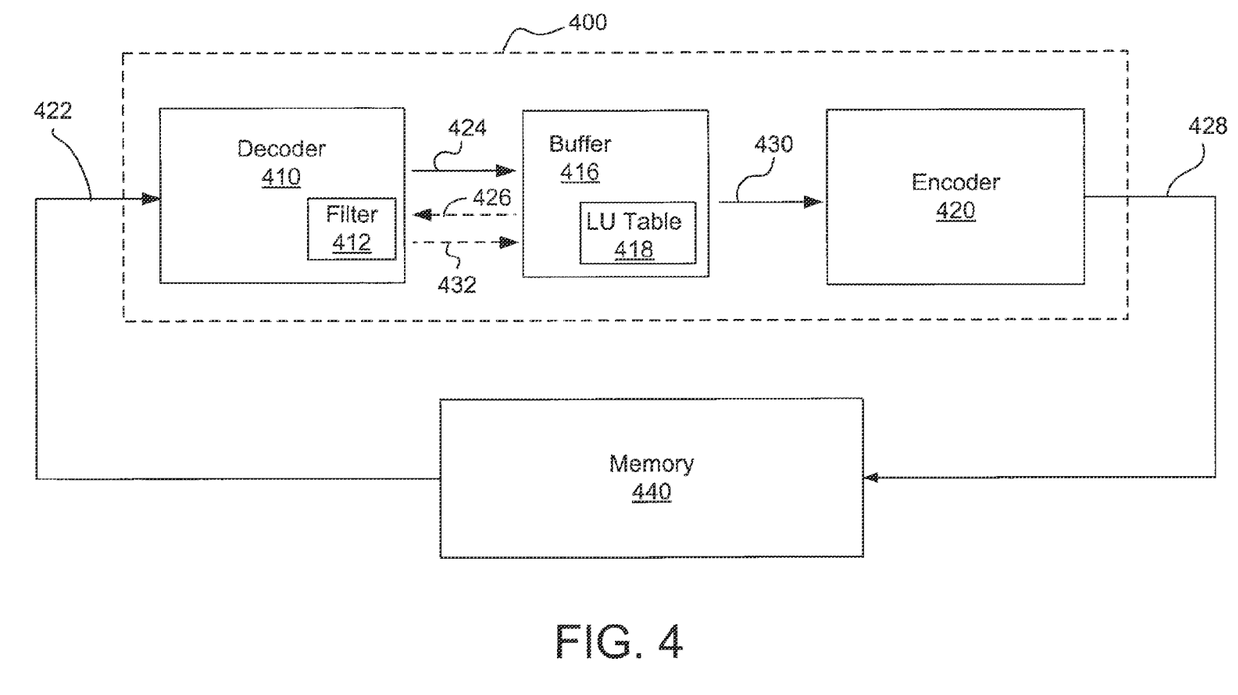
FIG. 4 is a block diagram illustrating a transcoding system with a buffer, according to one embodiment.

FIG. 4 is a block diagram illustrating a transcoder system, according to one embodiment. The transcoder system includes a transcoder chip 400, and an external memory module 440 coupled to the transcoder chip 400. The transcoder chip 400 includes, among other modules, a video decoding module 410, a buffer 416, and a video encoding module 420. The video decoding module 410 is coupled to the external memory module 440 to receive a frame of the video sequence encoded in a first format. The video encoding module 410 is coupled to the external memory module 440 to store the frame encoded in a second format. The buffer 416 exchanges data with the video decoding module 410 and the video encoding module 420.

The video decoding module 410 decodes simultaneously or sequentially a certain number of macroblocks in a frame encoded in the first format and stores decoded macroblocks 424 in the buffer 416. The video encoding module 420 retrieves the decoded macroblocks 430 and then encodes the macroblocks into the second format. The video decoding module 410, and the video encoding module 420, whether alone or in combination with other modules, can be implemented, for example, in software, hardware, firmware or any other combination thereof.

The first and second formats include, among other formats, MPEG-2 format, H.264 format, MPEG-4 part 2, VC-1, MPEG-1, DV, AVCHD, AVS, On2, H.263, Motion JPEG (MJPEG), RealVideo, Windows Media Video (WMV), and TrueMotion VP7.

MPEG-2 to H.264 Transcoding

In one embodiment, the first format (decoded format) is an MPEG-2 format, and the second format (encoded format) is a H.264 format. One of the issues in transcoding the MPEG-2 format to the H.264 format is that the H.264 format must use either the MBAFF coding sequence or field pictures for coding interlaced content. Because MPEG-2 material typically uses frame picture encoding versus field picture encoding, the most efficient way to transcode interlaced frame picture MPEG-2 content into H.264 frame pictures is to use MBAFF. Unfortunately, the MPEG-2 format does not support MBAFF. Specifically, the MPEG-2 format processes the macroblock in the non-MBAFF coding sequence, as explained above in detail with reference to FIG. 2A. In contrast, the H.264 MBAFF format processes the macroblock in the MBAFF coding sequence, as explained above in detail with reference to FIG. 2B. Because of such difference in coding sequences, the macroblocks decoded by the video decoding module 410 cannot be fed directly into the video encoding module 420 for encoding. Therefore, the buffer 416 is provided to rearrange the sequence of the decoded macroblocks 424.

Figure 5:
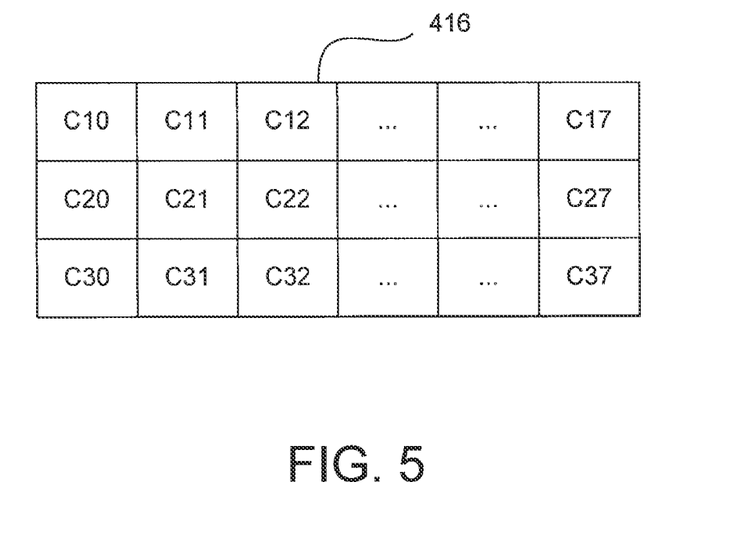
FIG. 5 is a diagram illustrating a buffer of a transcoding system for storing three rows of macroblocks, according to one embodiment.

FIG. 5 is a diagram illustrating the buffer 416 of a transcoding system processing four rows of macroblocks using only three rows of buffering, according to one embodiment. In this embodiment, the buffer 416 is formed on the transcoder chip 400. For the purpose of explanation, the frames being processed are assumed as having a width of eight (8) macroblocks. The buffer 416 is accordingly divided into twenty four (24) memory blocks to store three rows of decoded macroblocks. Each box in FIG. 5 represents a memory block for storing data of a single decoded macroblock. Memory blocks C10-C17 store one row of decoded top macroblocks (referring to FIG. 2A, for example, macroblocks 0-7), memory blocks C20-C27 store one row of decoded middle macroblocks (referring to FIG. 2A, for example, macroblocks 8-15), and memory blocks C30-C37 store the bottom row of macroblocks. Note that three rows of macroblocks are needed if the MPEG-2 is to be deblocked and the output format is MBAFF because pixels are needed from the third row of macroblocks in order to deblock the bottom pixels of the second row before reading out the top two rows in MBAFF coding sequence. The MBAFF format reads out two rows at once by alternatively taking even numbered macroblocks from a particular row and then taking odd numbered macroblock from the row below. It is possible to store fewer rows in the buffer 416 depending on the situation.

Note that the memory blocks C10-C37 of FIG. 5 are merely an example. The number of memory blocks needed for storing the decoded macroblocks can be varied depending on the maximum width of the frame to be processed. Also, note that each memory block or subset of the memory blocks may be implemented as a separate hardware module. Alternatively, all of the memory blocks C10-C37 may be implemented as a single hardware module.

In one embodiment, the buffer 416 further receives from the video decoding module 410 compressed video parameters such as quantization, motion vectors, and macroblock types and mode. The compressed video parameters of the macroblocks stored in the buffer 416 may then be used by the video encoding module 420 for efficient transcoding of input compressed video.

Figure 6:
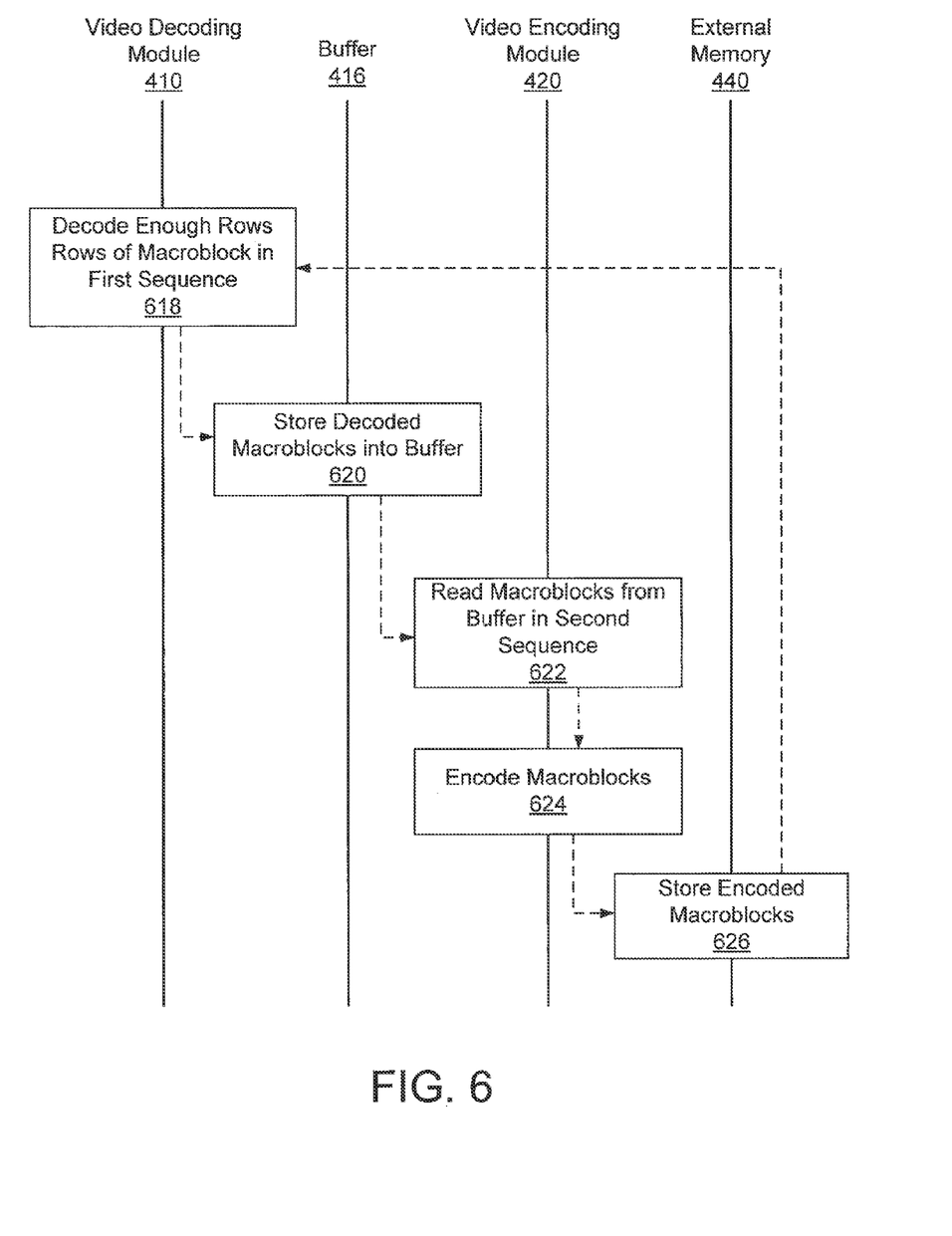
FIG. 6 is a flowchart illustrating a method of transcoding a video sequence, according to one embodiment.

FIG. 6 is a flowchart illustrating a method of transcoding a frame in the first format to the second format, according to one embodiment. In one embodiment, the first format is the MPEG-2 format, and the second format is the H.264 format. First, the three rows of macroblocks 422 are decoded 618 by the video decoding module 410 in a first sequence according to the non-MBAFF coding sequence. Specifically, the video decoding module 412 decodes the top macroblocks (referring to FIG. 2A, for example, macroblocks 0-7 or macroblocks 24-31). Then the decoded macroblocks 424 are stored 620 in the memory blocks C10-C17. The middle macroblocks (referring to FIG. 2A, for example, macroblocks 8-15 or macroblocks 32-39) are also decoded 618 and stored 620 in the memory blocks C20-C27. Then the bottom macroblocks (referring to FIG. 2A, for example, macroblocks 16-23 or macroblocks 40-47) are also decoded 618 and stored 620 in the memory blocks C30-C37.

In one embodiment, the first two rows of macroblocks may be optionally deblocked, as described below in detail with reference to FIG. 7.

Then, the video encoding module 420 reads 622 decoded macroblocks 430 from the buffer 416 in MBAFF coding sequence to obtain top and bottom macroblocks for an MBAFF macroblock pair (referring to FIG. 2B, for example, macroblocks 0 and 1 make an MBAFF pair) in the MBAFF coding sequence. Specifically, the video encoding module 420 reads 622 data in the MBAFF coding sequence by alternatively reading a macroblock from the top row of blocks C0-7 and the middle row of blocks C10-C17. Then the video encoding module 420 encodes 624 the top and middle macroblocks (for example, macroblocks 0-15 of FIG. 2B) in the H.264 format.

After transcoding the two rows of macroblocks (macroblocks 0-15 in FIG. 2A), the process returns to step 618 and repeats the subsequent steps for the next two rows of macroblocks (referring to FIG. 2A, for example, macroblocks 24-39 are written into the buffers which used to store macroblocks 0-15, and macroblocks 16-31 are processed). Note that only two rows, specifically the middle and bottom row, are written to the buffer because the third row is still in the buffer and becomes the top macroblock for the next set of MBAFF macroblock pairs. The steps 618 to 626 are repeated until all the rows of macroblocks in the frame are transcoded. Then the same steps 618-626 are repeated for the rows of macroblocks in the next frame.

H.264 to MPEG-2 Transcoding

In another embodiment, the first format is the H.264 format and the second format is the MPEG-2 format. That is, the transcoder chip 400 transcodes a video sequence in the H.264 MBAFF format to the MPEG-2 non-MBAFF format. As explained above with reference to FIGS. 2A and 2B, the H.264 format uses the MBAFF coding sequence whereas the MPEG-2 format uses the non-MBAFF coding sequence. Because of the difference in the coding sequences of the macroblocks in the MBAFF coding sequence and the non-MBAFF coding sequence, the macroblocks decoded by the video decoding module 410 cannot be fed directly into the video encoding module 420.

In one embodiment, the process of transcoding the video sequences from the H.264 MBAFF format into the MPEG-2 non-MBAFF format uses different sequences of writing the data to the buffer 416 and reading the data from the buffer 416. Specifically, referring to FIG. 6, the video decoding module 410 decodes 618 the MBAFF macroblock pairs (referring to FIG. 2B, for example, macroblocks 0-15) in the MBAFF coding sequence and stores 620 the decoded macroblocks 424 in the memory blocks C10-C27 by alternatively writing a macroblock to the top row C10-C17 and the bottom row C20-C27.

The video encoding module 420 reads 622 data of the decoded macroblocks 430 from the memory blocks C10-C27 (referring to FIG. 2A, for example, macroblocks 0-15) in the non-MBAFF coding sequence. Specifically, the video encoding module 420 reads 622 data for the top row of macroblocks (referring to FIG. 2A, for example, macroblocks 0-7) from the memory blocks C10-C17, and the data for the next row of macroblocks (referring to FIG. 2A, for example, macroblocks 8-15) from the memory blocks C20-C27 in the non-MBAFF coding sequence. The decoded macroblocks 430 are then encoded 624 to the MPEG-2 format by the video encoding module 420.

After the two rows of the incoming H.264 macroblocks (referring to FIG. 2B, for example, macroblocks 0-15) in the MBAFF coding sequence are encoded 624, the video decoding module 410 decodes and stores the next two rows of macroblocks (referring to FIG. 2B, for example, since macroblocks 16-31 are already in the buffers for deblocking, macroblocks 32-47 are decoded) in the MBAFF coding sequence. The video encoding module 420 then reads the next two rows of macroblocks (referring to FIG. 2A, for example, macroblocks 16-31) in a sequence as explained above to obtain macroblocks in the non-MBAFF coding sequence. Then the video encoding module 420 encodes the non-MBAFF coded macroblocks.

In one embodiment, the storing of the macroblocks by the decoding module 410 is interleaved with reading of macroblocks by the encoding module 420 to increase the efficiency and speed of transcoding.

The process is repeated until all the rows of the macroblocks in the frame are transcoded into the MPEG-2 format. Then the same steps 618-628 are repeated for the rows of macroblocks in the next frame.

Deblocking Process

The buffer 416 can also be used for expediting a deblocking process. The deblocking process improves visual quality and prediction performance by smoothing the sharp edges which may form between the decoded macroblocks. The deblocking process may be performed as part of the transcoding process to enhance the quality of the transcoded video sequences or may be required if the incoming video sequence is H.264 with deblocking enabled.

To deblock a row of macroblocks, the deblock filter 412 needs the macroblock row above and below, except for the first row where there is no row above and the last row where there is no row below. For MBAFF field macroblocks, the filter needs two macroblock rows above and two macroblock rows below to complete the deblock. In other words, up to six (6) rows of macroblocks are needed to completely deblock a particular macroblock. In one embodiment, the deblocking is done with only three (3) rows of buffer by partially deblocking MBAFF field macroblocks using the two rows above, and then finishing the deblocking when the top two rows are read out and the next two rows are written in. Normally, this would require four (4) rows of macroblock buffers, but the write and read operations are interleaved to reduce the number to three (3) rows of buffers. An address look-up table 418 may be used to map four (4) rows of macroblocks into three (3) rows of buffers because the order of the macroblocks in the buffers may constantly change. Although FIG. 4 illustrates the look-up table 418 as being included in the buffer 416, the look-up table 418 may be included in the decoder 410, the encoder 420 or other components of the transcoder chip 400. Alternatively, the look-up table 418 may be a component separate from the decoder 410, the buffer 416, and the encoder 420.

A deblocking filter 412 needs macroblocks surrounding a target macroblock to perform the deblocking of the target macroblock. But not all of the macroblocks surrounding the target macroblock are decoded before the target macroblock is decoded. For example, in the H.264 format or the MPEG-2 format, the macroblock at the right side of the target macroblock and the macroblock below the target macroblock are generally decoded after the target macroblock, and may not be available to the deblocking filter 412 when deblocking the target macroblock. Therefore, macroblocks can be partially deblocked before being written to the buffer with the completion of the deblock process occurring when the macroblock is read from the buffer because the target macroblock must be stored temporarily until all of the surrounding macroblocks are decoded. Note that the macroblock can be partially filtered before being stored using just the macroblocks above and to the left so that the macroblocks above and to the left can be removed from the storage to reduce the overall storage needed. This can be accomplished by interleaving the writing and reading operations of the buffer.

In one embodiment, the deblocking filter 412 is a part of the video decoding module 410. The deblocking filter 412 may be an in-loop filter. The deblocking filter 412 receives decoded macroblocks 426 from the buffer 416, performs the deblocking of the decoded macroblocks, and updates the buffer 416 with deblocked macroblocks 432.

In one embodiment, the transcoder chip 400 is used for transcoding a video sequence in the MPEG-2 format into VC-1 format. Both the MPEG-2 format and VC-1 format uses the non-MBAFF coding sequence. Therefore, macroblocks decoded from the video decoding module 410 can be fed directly to the video encoding module 420 if the deblocking process is not performed. The buffer 416, however, is needed in this embodiment to perform deblocking on the decoded macroblocks before the decoded macroblocks are encoded by the video encoding module 420.

Figure 7:
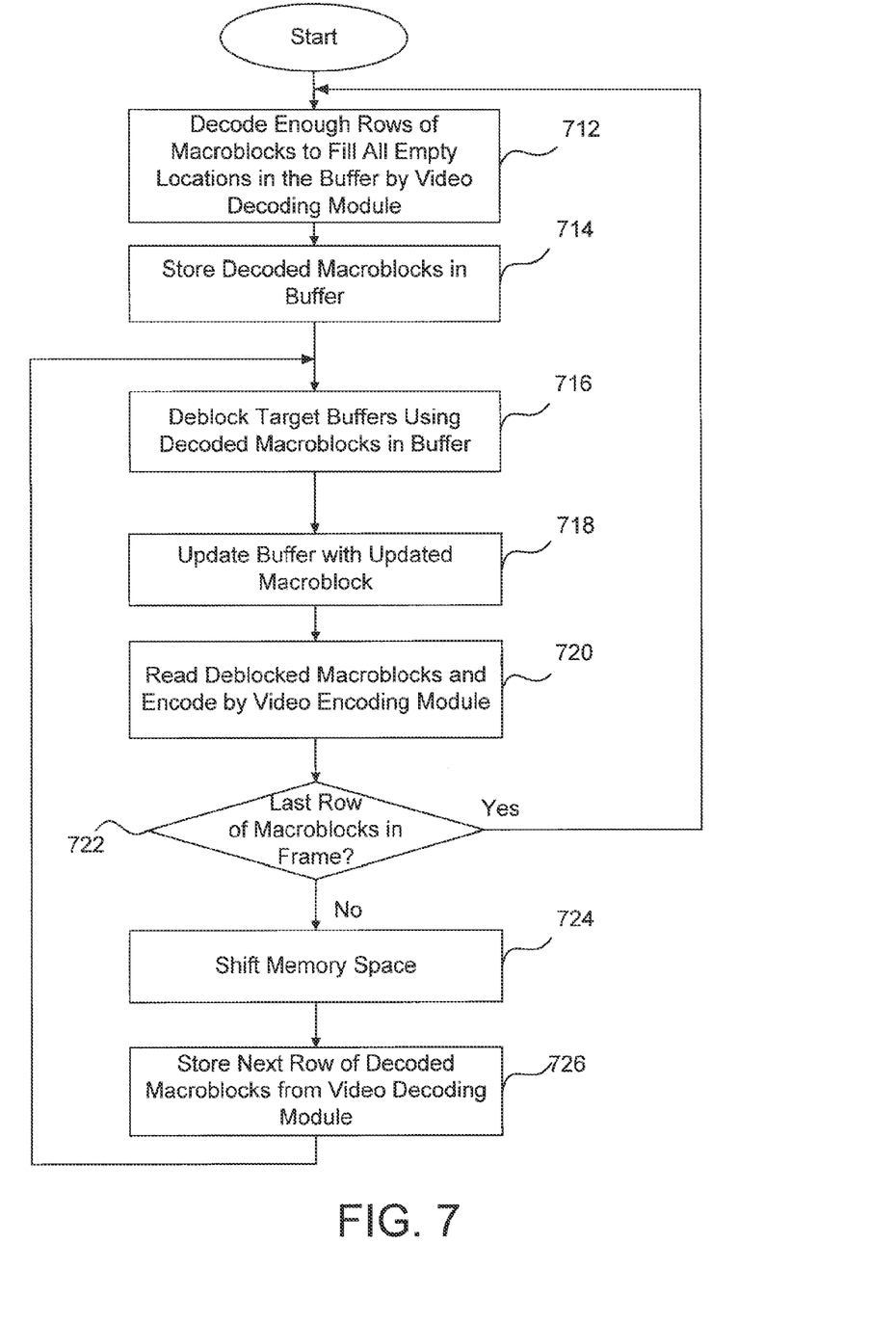
FIG. 7 is a flowchart illustrating a method of deblocking and transcoding a video sequence, according to one embodiment.

FIG. 7 is a flowchart illustrating a method of deblocking and then encoding the macroblocks, according to one embodiment. The video encoding module 410 receives undecoded macroblocks 422, decodes 712 two (2) rows of the undecoded macroblocks 422, and stores 714 the decoded macroblocks 424 in the buffer 416. Specifically, for the MPEG-2 to VC-1 case, top macroblocks (referring to FIG. 2A, macroblocks 0-7) are decoded 712 and stored 714 in the memory blocks C10-C17 of FIG. 5, and bottom macroblocks (referring to FIG. 2A, macroblocks 8-15) are decoded 712 and stored 714 in the memory blocks C20-C27 of FIG. 5.

After the two rows of macroblocks (referring to FIG. 2A, for example, macroblocks 0-15) are decoded, the deblocking filter 412 reads the target macroblock and surrounding macroblocks 426 from the buffer 416, and deblocks 716 the target macroblock. The deblocking filter 412 can deblock each individual target macroblock in sequence for the first row of macroblocks (referring to FIG. 2A, for example, macroblocks 0-7). The deblocked target macroblock 428 then overwrites 718 the undeblocked macroblock stored in the buffer 416. Note that another row of macroblocks (referring to FIG. 2A, for example, macroblocks 16-23) must be decoded and stored into the buffers in order to fully deblock the second row of macroblocks (referring to FIG. 2A, for example, macroblocks 8-15).

The deblocked macroblocks are then read and encoded 720 by the video encoding module 420. The process determines 722 whether the deblocked macroblocks are the last row of macroblocks in the frame. If the deblocked macroblocks are not the last row in the frame, the data of the second row of macroblocks stored in the memory blocks (referring to FIG. 5, for example, macroblocks C20-C27) are effectively shifted 724 up to the memory blocks (referring to FIG. 5, for example, macroblocks C10-C17) of the buffer 416. In one embodiment, no physical copying of the data in the memory blocks occurs. Instead, the hardware keeps track of where rows of macroblocks are stored.

Thereafter, data for the next row of decoded macroblocks 424 is stored 726 in the second row of the memory blocks C20-C27 of the buffer 416. The process returns to step 716, and the subsequent steps 718 to 726 are repeated. If it is determined in step 722 that the deblocked macroblocks are the last row of macroblocks in the frame, the process returns to the step 712, and the subsequent steps are repeated for the next frame.

In an alternative embodiment, the buffer 416 is used for decoding a frame in the non-MBAFF coding sequence, deblocking the decoded macroblocks, and encoding the deblocked macroblocks into a frame in the MBAFF coding sequence. The process of deblocking the target process is essentially the same as explained above with reference to FIG. 7, except that in step 712, three rows of macroblocks are decoded, and in step 720, the video encoding module 420 reads two rows of deblocked macroblocks 430 in the MBAFF coding sequence explained above, e.g., in the section entitled "MPEG-2 to H.264 Transcoding."

In one embodiment, the buffer 416 is used for decoding a frame in the MBAFF coding sequence, deblocking the decoded macroblocks, and encoding the deblocked macroblocks into a frame in the non-MBAFF coding sequence. The process of deblocking the target process is essentially the same as explained above with reference to FIG. 7, except that in step 712, four rows of macroblocks are decoded, and in step 720, the video encoding module 420 reads two rows of deblocked macroblocks 430 in the non-MBAFF coding sequence explained above, for example, in the section entitled "H.264 to MPEG-2 Transcoding." As stated earlier, four rows of macroblocks can be processed with only three rows of buffer by interleaving reads and writes to the buffer and an address look-up table may be used to map four (4) rows of macroblocks into three (3) rows of buffers because the order of the macroblocks in the buffers may constantly change.

In one embodiment, the buffer 416 is used for decoding a frame in the MBAFF coding sequence, deblocking the decoded macroblocks, and encoding the deblocked macroblocks into a frame in the MBAFF coding sequence. The process of deblocking the target process is essentially the same as explained above with reference to FIG. 7, except that in step 712, four rows of macroblocks are decoded, and in step 720, the video encoding module 420 reads two rows of deblocked macroblocks 430 in the MBAFF coding sequence. As stated earlier, four rows of macroblocks can be processed with only three rows of buffer by interleaving reads and writes to the buffer and an address look-up table 418 may be used to map four (4) rows of macroblocks into three (3) rows of buffers because the order of the macroblocks in the buffers may constantly change. For the MBAFF to MBAFF case, the macroblocks are not reordered.

The method of deblocking the macroblocks in the MBAFF coding sequence depends on whether the current macroblock pair and the macroblock pairs above, below, left and right are coded as field or frame macroblocks. In one embodiment, the deblocking is performed as described in the H.264 specification.

Alternate System (or Method) Embodiments

In one embodiment, the buffer 416 is used for performing other processing on macroblocks such as filtering the motion vectors in both the horizontal and vertical direction using the stored motion vectors for the surrounding macroblocks to improve the quality of transcoding. Filters for such purpose include, among others, a median filter, and a low-pass filter.

In one embodiment, the video sequences encoded by the video encoding module 420 are sent over a network in real time instead of being stored in the memory 440 for later retrieval. Alternatively, the video decoding module 410 may be coupled to a sensor of an image capturing device (e.g., video camera) instead of the external memory 440. By using the buffer 416, the transcoder chip 400 may operate at a speed sufficient to transcode the video sequence in real time.

In one embodiment, the buffer 416 is shared by multiple video encoding modules and video decoding modules, each module capable of encoding or decoding the video sequences in different formats. The transcoder chip 400 may include switches to couple the buffer to different video encoding modules and video decoding modules.

The various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

As noted previously, some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

The transcoder system according to the embodiments reduces data traffic between a transcoder chip and external memory when transcoding a video sequence between formats using the MBAFF coding sequence and formats using the non-MBAFF coding sequence. Another advantage is that the data transfer between the transcoder chip and external memory during deblocking process is decreased significantly. The transcoder system according to the embodiments, also provide increased processing speed compared.

Upon reading this disclosure, those of skill in the art will appreciate still additional alternative structural and functional designs for a system and a process for performing motion estimation, deinterlacing, or noise reduction through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the embodiments disclosed herein without departing from the spirit and scope as defined in the appended claims.

What is claimed is:

1. A system for processing a video sequence, comprising:
a memory module configured to receive macroblocks in a frame or field of a first video sequence in a first format, the memory module configured to simultaneously store a subset of the received macroblocks fewer than all macroblocks in the frame or field; and
a video encoding module coupled to the memory module, the video encoding module configured to retrieve the stored macroblocks from the memory module in a second sequence, the video encoding module further configured to encode the retrieved macroblocks into a frame or field of a second video sequence in a second format.

2. The system of claim 1, wherein the subset of the received macroblocks is three rows of the received macroblocks.

3. The system of claim 2, wherein four rows of macroblocks in the frame or field of the first video sequence are processed by interleaving storing of the decoded macroblocks to the memory module and retrieving of the stored macroblocks from the memory module using a look-up table.

4. The system of claim 1, further comprising a video processing module coupled to the memory module, wherein the video processing module is configured to process the frame or field of the first video sequence for storing in the memory module.

5. The system of claim 4, wherein the processing of the frame or the field of the first video sequence comprises decoding of the frame or the field of the first video sequence to obtain the macroblocks.

6. The system of claim 4, wherein the processing of the frame or the field of the first video sequence comprises performing filtering of motion vectors of the macroblocks in horizontal and vertical direction.

7. The system of claim 4, wherein the processing of the frame or the field of the first video sequence comprises deblocking of the macroblocks.

8. The system of claim 1, wherein the first format uses a Macroblock-Adaptive Frame/Field (MBAFF) coding sequence, and the second format uses a non-MBAFF coding sequence.

9. The system of claim 1, wherein the first format uses a non Macroblock-Adaptive Frame/Field (MBAFF) coding sequence, and the second format uses a MBAFF coding sequence.

10. A method for processing a video sequence, comprising:
receiving, at a memory module, macroblocks in a frame or field of a first video sequence in a first format;
storing simultaneously in the memory module a subset of the received macroblocks fewer than all macroblocks in the frame or field;
retrieving, at a video encoding module, the stored macroblocks from the memory module in a second sequence; and
encoding the retrieved macroblocks into a frame or field of a second video sequence in a second format.

11. The method of claim 10, wherein the subset of the received macroblocks is three rows of the macroblocks in the frame or the field.

12. The method of claim 11, wherein four rows of macroblocks are processed by interleaving storing of the macroblocks to the memory module and reading of the stored macroblocks from the memory module using a look-up table.

13. The method of claim 10, further comprising processing the frame or field of the first video sequence for storing in the memory module.

14. The method of claim 13, wherein the processing of the frame or the field of the first video sequence comprises decoding of the frame or the field of the first video sequence to obtain the macroblocks.

15. The method of claim 13, wherein the processing of the frame or the field of the first video sequence comprises performing filtering of motion vectors of the macroblocks in horizontal and vertical direction.

16. The method of claim 13, wherein the processing of the frame or the field of the first video sequence comprises deblocking of the macroblocks.

17. The method of claim 10, wherein the first format uses a Macroblock-Adaptive Frame/Field (MBAFF) coding sequence, and the second format uses a non-MBAFF coding sequence.

18. The method of claim 10, wherein the first format uses a non Macroblock-Adaptive Frame/Field (MBAFF) coding sequence, and the second format uses a MBAFF coding sequence.

19. A non-transitory computer readable storage medium structured to store instructions executable by a processing system, the instructions when executed cause the processing system to:
   receive, at a memory module, macroblocks in a frame or field of a first video sequence in a first format;
   store simultaneously in the memory module a subset of the received macroblocks;
   retrieve, at a video encoding module, the stored macroblocks from the memory module in a second sequence fewer than all macroblocks in the frame or field; and
   encode the retrieved macroblocks into a frame or field of a second video sequence in a second format.

20. The computer-readable storage medium of claim 19, wherein the subset of the received macroblocks is three rows of the macroblocks in the frame or the field.

\* \* \* \* \*